May 12, 1936.  H. E. TAUTZ  2,040,718
TRUNNION
Filed Nov. 20, 1933    3 Sheets-Sheet 1

INVENTOR
HERBERT E. TAUTZ,
Carl A. Hellmann,
ATTORNEY

May 12, 1936.  H. E. TAUTZ  2,040,718
TRUNNION
Filed Nov. 20, 1933   3 Sheets-Sheet 3

INVENTOR
HERBERT E. TAUTZ,
Carl A. Hellmann,
ATTORNEY

Patented May 12, 1936

2,040,718

UNITED STATES PATENT OFFICE 2,040,718

TRUNNION

Herbert E. Tautz, Milwaukee, Wis., assignor to Delta Manufacturing Company, Milwaukee, Wis.

Application November 20, 1933, Serial No. 698,902

15 Claims. (Cl. 143—132)

The present invention relates to machine tables.

More specifically, an object of the invention is to provide trunnions for the tables of machine tools and for other purposes, whereby the structure supported by such trunnions may be rotated about an axis.

Still more specifically, the invention relates to providing a plurality of spaced trunnion members, preferably located a considerable distance apart with respect to the member supported thereby, thus providing for a firmer securing of the supported member and more nearly accurate rotation about the said axis, said axis being preferably located in the upper surface of the supported member itself for reasons which will be discussed in the present specification.

A further object of the invention resides in making trunnions by providing members which can be easily and cheaply made by punching and forming, from relatively thin sheet material and which will nevertheless, have adequate strength and great accuracy and precision.

A further object of the invention is to provide a machine table having a means for entering the tool into the table so disposed as not to interfere with the spaced trunnions.

Other objects and advantages of the invention will in part be explained in the accompanying specification and will in part be self-evident from the structures involved.

In order to make it possible to understand the invention more clearly, an embodiment of the invention is disclosed in the accompanying drawings and described in the present specification.

In said drawings.

In all the figures similar parts are designated by the same reference characters.

Figure 1:
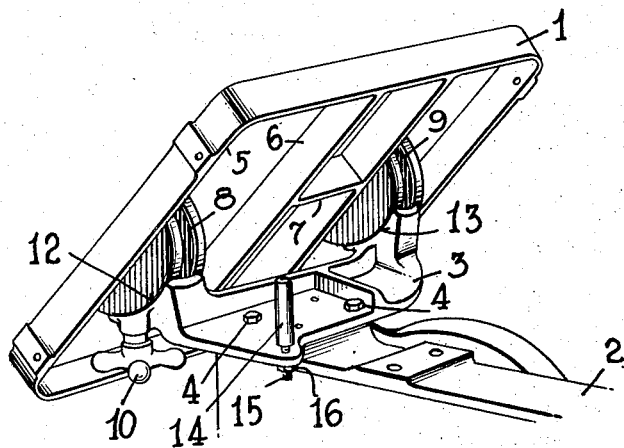
Fig. 1 is a perspective rear view of one form of the invention as applied to a machine table, specifically a band saw table, said figure showing particularly the underside of the table when said table is tilted.

Referring first to Fig. 1 there is shown a table 1 mounted upon a supporting frame 2, a bracket 3 being interposed between the table 1 and frame 2 to facilitate this connection. The bracket 3 may be secured to the frame 2 in any desired manner, as by bolts or cap screws 4, 4. The table 1, for strength and lightness, may be made of skeleton or ribbed construction by means of the flanges and ribs 5, 6, 7, etc., as is customary in tables of this sort. The table, as shown, is mounted on a pair of trunnions 8, at one side, and an additional pair of trunnions 9 at the other side, star wheels 10 and 11 (Figs. 2 and 3) being provided for securing these trunnions in their adjusted positions. The bracket 3 is provided with suitable seats at 12 and 13 respectively, cooperating with the trunnions 8 and 9. A stop member 14 provided with an adjusting means, such as a screw 15, which is threaded through the bracket member 3 and locked in position as by a lock nut 16, cooperates with the lower surface of the table 1 to determine a certain definite position of the table, for example, the desired normal position of the table at right angles to a band saw blade or other tool.

Figure 2:
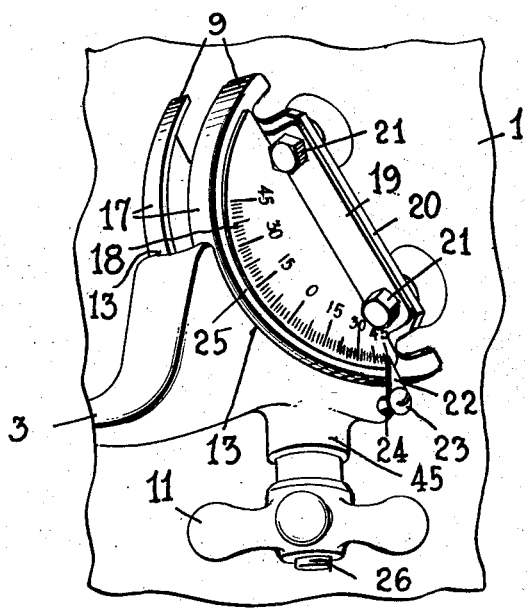
Fig. 2 is a detail perspective view showing the front pair of trunnions.

Referring now to Fig. 2, which illustrates the structure of one pair of trunnions 9, 9, on a much larger scale than they are shown in Fig. 1, it will be noted that the bracket member 3 has seats at 13, 13, shaped to conform to the curvature of the outer cylindrical surface 17 of each of the trunnions 9, so that said surfaces 17 may bear closely and uniformly upon the seats 13, 13. A scale 18 may be provided upon a suitable piece of material 19, preferably metal, which may be secured to the flange 20 of one of the members 9, said member being secured to the table 1 by suitable cap screws or the like 21, passing through apertures in the flanges and entering into the material of the table top 1, as shown. A pointer 22 may be secured to the bracket member 3 by means of a screw 23 and a spacing member or collar 24, said pointer thus being slightly adjustable by loosening the screw 23. Each member 9, as shown, is formed of a substantially semicircular portion 25 having a cylindrical flange 17 thereon, said flange 17 extending substantially at right angles to the said semi-circular portion 25 at the circumference thereof, and also having the flange 20 arranged on the semi-circular portion 25 and bent preferably at right angles thereto, as illustrated, the whole being formed from a single piece of metal or the like by punching and drawing in a press. By reason of such method of manufacturing the members 9, it is obvious that extreme accuracy in their configuration is readily attainable and that they will all be precisely alike and interchangeable, thus materially facilitating the assembling of the trunnions and increasing the degree of accuracy attainable in their construction and operation.

Figure 4:
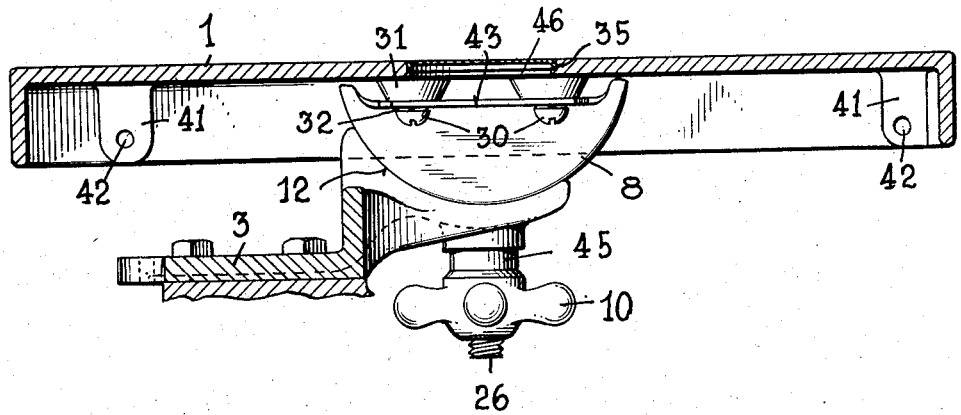
Fig. 4 is a cross section of the table shown in Fig. 3, said section being taken on the plane indicated by the line 4—4 of Fig. 3 and the table being shown right side up, instead of inverted.

While the trunnion members 8 or 9 have been described as substantially semi-circular, it is obvious that this is an approximate term, because the portion 25 lacks something of being a true semi-circle, namely, the distance between the fold-line 43 (Fig. 4) of the flange and the upper surface of the table. In other words, the center of curvature of the circular cylindrical flanges 17 would lie in the upper surface of the table. However, the term "semi-circular" is a convenient designation, and will be herein used to define the said shape, with the understanding that it is employed in a practical sense rather than in its strict geometrical meaning.

Figure 5:
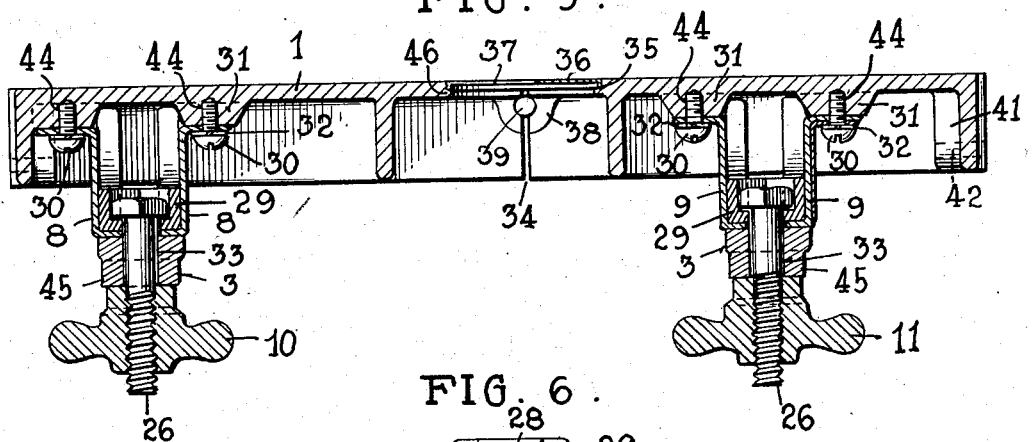
Fig. 5 is a cross section of the table shown in Fig. 3, on the plane indicated by the line 5—5, said cross section also being shown right side up.
Figure 6:
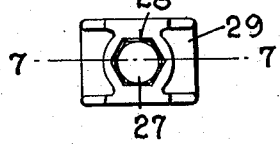
Fig. 6 is a detail plan view of clamping means forming part of the trunnion structure and Fig. 7 is a cross section of the parts shown in Fig. 6, on the plane indicated by the line 7—7.
Figure 7:
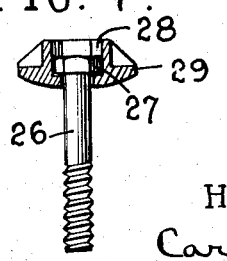

In order to permit adjustment of the trunnions with respect to the bracket member 3 and to permit securing them in their final adjusted positions, the star wheels 10 and 11 have been provided, said star wheels cooperating with the threaded bolts 26 (Figs. 4, 5, 6 and 7), each of which has a polygonal head 27, here shown as hexagonal, said heads being received in correspondingly shaped bores or recesses 28, formed in the clamping washers 29, best shown in Figs. 5, 6 and 7.

Referring now to Fig. 5 it will be seen how the stampings 8, 8 and 9, 9, forming the two pairs of trunnions, may be secured to the table top 1 by means of suitable screws 30 entering into threaded bosses 31, formed on said table top, lock washers 32 being preferably interposed below the heads of the screws 30 to prevent their undesired loosening in service, due to vibration or other causes.

It will be noted that the bosses 31 and the threaded bores 44 therein are properly located to bring the trunnion members 8, 8 and 9, 9 to a proper spacing from one another to receive the clamping washer 29 between the members of each of said pairs. The screws or bolts 26 pass through said clamping washers and through suitable bores 33 formed in bosses 45 of the bracket 3, as best shown in Fig. 5, the corresponding star wheels 10 and 11 being actually nuts engaged on the screws 26, so that when said star wheels 10 and 11 are loosened the table top may be pivoted and rotated about the central axis of the cylindrical flanges on the trunnions 8 and 9, which flanges may then be clamped securely between the clamping washers 29 and the seats 12 and 13 on the bracket 3 by tightening the respective star wheels 10 and 11.

It is clear that the clamping washer 29 will prevent any relative rotation of the screws 26, by reason of the polygonal heads 27 of said screws fitting in the recesses 28 and the washers 29 themselves will, of course, be incapable of rotation because they fit slidably but fairly closely between the inner surfaces of the semicircular portions of the said trunnion members 8 and 9, respectively. Preferably the center or axis of the said cylindrical flange of each member 8 and 9 is located in the upper surface of the table top 1 as already stated, so that upon tilting the table by means of the trunnions said table will rotate about an axis lying in its upper surface, whereby the point at which the saw blade or other tool enters the table, will not change when the table is tilted in either direction.

It will be noted that a pair of sets of trunnion members is provided in the present case, one set of trunnions being arranged near the front of the table and the other near the rear thereof, with the opening for receiving the saw blade or the like arranged between the said sets of trunnions. This construction affords a rigid and substantial bearing for the table, but one which would not be possible in the ordinary construction of band saw table wherein a slot is provided running from the front of the table to slightly beyond the center thereof, serving to permit the band saw blade to be put into position or removed from position with relation to the table. It is obvious that such slot would be of no use if it were obstructed by a trunnion or set of trunnions, as would be the case if it were attempted to apply the ordinary type of slot to a table with a pair of spaced sets of trunnion members, as in the present case.

It is, therefore, another feature of the present invention to provide the slot for putting the band saw blade into and out of position in an unusual direction, namely, at right angles to the position formerly customary so that said slot now extends from a point at the center of the table preferably to the right hand edge of said table and the band saw blade must, therefore, be introduced from the side instead of from the front of the table. It will be noted that the slot 34 accordingly is arranged in this location, as best shown in Figs. 3 and 5.

The usual circular opening 35 is provided at the center of the table and may be partly closed by means of an insert 36, resting upon the shoulder 46 and having a slot 37 extending from an edge thereof to slightly beyond its center to receive the customary band saw blade and substantially close the opening 35. It will be noted that the slot 37 is preferably turned toward the rear of the table, as shown in Fig. 3, so that the front portion of the insert, as well as all of the table in front of the saw blade, is entirely free from any slot. This affords an additional advantage in the case of band saws as the absence of a slot in front of the saw blade avoids the possibility of any portion of the work becoming caught in the slot, which is a matter of considerable importance when delicate work is being done or when the work-piece has a lower surface of such nature as might be caught or undesirably guided by any such slot, in front of the saw blade.

It is, therefore, obvious that there is a double advantage in providing the slot 34 at right angles to its position customary in former saws and in turning the slot 37 to a position precisely opposite that formerly customary.

Figure 3:
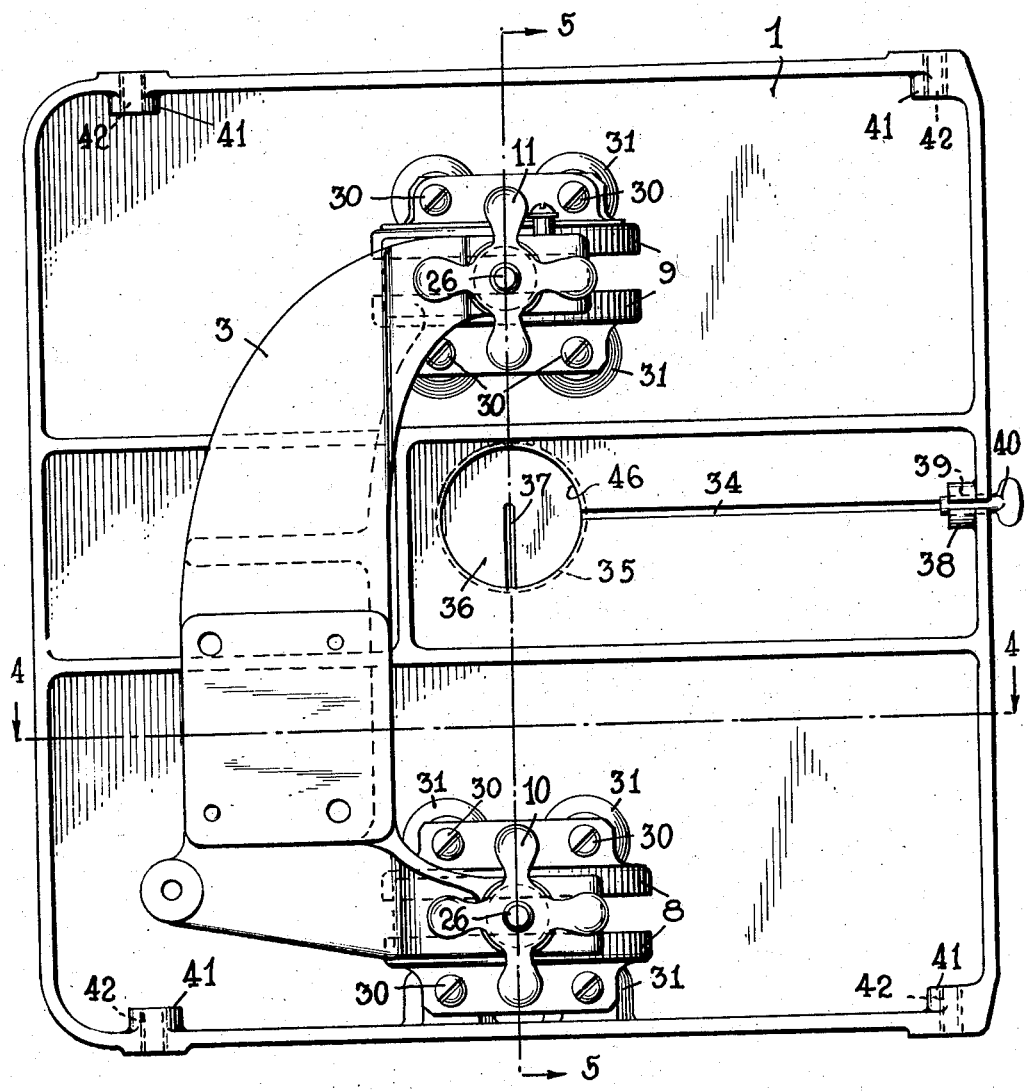
Fig. 3 is a bottom plan view of the table shown in Fig. 1.

In order to prevent any possibility of even slightly deforming the right hand part of the table 1 by reason of the pressure of heavy work upon the forward or rearward portion thereof, while the other portion is relatively unloaded, a lug 38 may be provided in such position that the slot 34 will substantially bisect it, as shown in Figs. 3 and 5, a bore 39 being formed in said lug and adapted to receive a suitable, preferably tapered, plug 40 removably fitting therein and preventing any vertical displacement of one portion of the lug 38 with respect to the other portion thereof, thus holding the entire top surface of the table 1 in its proper plane configuration.

The table 1 may also be provided with a plurality of lugs or bosses 41 arranged preferably at or near the inner corners thereof, each such boss or lug having a suitable threaded bore 42 therein, and serving for attaching guide members or the like, suitable for guiding a fence or rip gage for use in connection with the saw. Such guides and rip gages, however, form no part of the present invention and are mentioned merely to explain the purpose of the lugs 41 with bores 42. They may be of the type disclosed in the United States patent of Herbert E. Tautz, No. 1,938,548, issued December 5, 1933, for Machine table extensions, or of any other suitable type.

The operation of the trunnion structure just described will be obvious from the above description of the same. Assuming that the trunnions are applied to the table of a machine tool, for example a band saw, as above disclosed, ordinarily and for most of the work the table will be in a normally horizontal position, or rather, in a position at right angles to the cutting saw blade and this position is readily attained by loosening the two star wheels 10 and 11 slightly and tilting the raised portion of the table downward from the position shown in Fig. 1 until a portion of the under surface of the table abuts against the upper end of the stop member 14.

In this position the saw blade should be perpendicular to the plane of the table top and, if it is not, it can be brought into such position by suitably adjusting the stop 14 by means of the screw 15 and then securing it in adjusted position by the lock nut 16. Once adjusted, this stop member of course needs no further readjustment, in the absence of accident or serious and violent derangement of the alinement of the table. The table can be securely clamped in this perpendicular position by tightening the star wheels 10 and 11, thus holding the table to the bracket 3 at two spaced locations, namely, at the two sets of trunnions 8 and 9, respectively.

When the table is in this position, the pointer 22 may be adjusted so as to read zero on the scale 18 and upon having made this adjustment by loosening the screw 23, moving the pointer 22 to its appropriate position and again tightening the screw 23, said pointer will thereafter be in proper adjustment for indicating, on the said scale 18, the angular position of the table with respect to the saw blade. In the position shown in Fig. 2 the table would be tilted 45°, as shown by the pointer.

By reason of the fact that the trunnion members 8, 8 and 9, 9 are stamped accurately from suitable sheet metal or the like they will, of course, fit accurately upon the seats 12 and 13, which are corresponding circular-cylindrical arcs, and which may be bored or machined in any suitable way, to be accurately alined with one another. The table will, therefore, tilt about the axis of the cylinder of which the seats 12 and 13 are arcs and this axis, as stated, is preferably chosen so as to lie in the upper surface of the table and in the plane of the band saw blade.

It should not be assumed that this table is limited in any way to band saws or in fact even to saws, for it is equally applicable, for example, to the table of a drill press or in fact any other machine tool, wherein a tilting table is advantageous. A characteristic feature of the present table is that it is firmly supported at two widely spaced locations by two independent sets of trunnions and that it is rotatable about the axis of such trunnions, such axis preferably being positioned in the upper surface of the table top itself, so that the line or point of intersection or contact of the cutting tool and the plane of the table top will remain fixed regardless of the angular tilt of the table.

It will, of course, also be obvious that while in the present case the semi-circular trunnion stampings have been used in pairs it will not be necessary in all cases to do so, inasmuch as a single trunnion member may be used in each case instead, that is, one of the members 8 may be omitted and one of the members 9 may be omitted, and, nevertheless, many of the advantages of the invention will still be secured. It is, however, preferred to employ two trunnion shells at each location as this provides a much more substantial and rigid construction and only the preferred form has, therefore, been illustrated, without, however, thereby limiting the invention to the said preferred form.

It is moreover obvious that many of the advantages of the present invention may be obtained by using trunnions of different type from those specifically disclosed, namely, the feature of providing a bearing near the front and rear respectively of the table, is a very valuable feature, which is independent of the particular type of bearing or trunnion employed and is made possible by arranging the saw-entering slot at right angles to its formerly customary position.

While the trunnions and other features herein have been described as specifically embodied in a band saw table, it will, of course, be understood that the construction is by no means to be limited to such use thereof, but that the trunnions will be applicable for many other purposes besides band saw tables. No limitation is, therefore, to be implied by the present specific disclosure and the scope of the invention is to be determined solely by such limitations as appear in the following claims.

I claim:

1. A machine table having two trunnions near the front and rear ends thereof respectively, said table having a tool-inserting opening leading to a side edge of the table and located between said trunnions, the axis of the trunnions being substantially in the cutting plane of the tool.

2. A machine table having two trunnions near the front and rear ends thereof respectively, said table having a tool-inserting opening leading to a side edge of the table and located between said trunnions, the axis of the trunnions being substantially in the cutting plane of the tool and lying substantially in the upper surface of the table.

3. A machine table having two trunnions near the front and rear ends thereof respectively, said table having a tool-inserting opening located between said trunnions, the axis of the trunnions being substantially in the cutting plane of the tool, and the opening extending to one side of the table, and a removable connecting means joining together the two portions of the table formed by said opening, to provide additional rigidity and prevent springing.

4. A machine table top having a tool-inserting opening leading to a side edge thereof and a trunnion for pivotally supporting said top, said trunnion being located in front of said opening and consisting of a substantially semi-circular and imperforate plate having an arcuate flange along its circumference, and a substantially diametrically located plane flange, means for securing the said plane flange of the plate to the said table, a bearing having a seat therein shaped to receive the arcuate flange of the trunnion, and means for clamping the said arcuate flange to the bearing.

5. A machine table top having a tool-inserting opening leading to a side edge thereof and a set of trunnions for pivotally supporting said top, said trunnions being located in front of and behind said opening, respectively, and consisting of a pair of substantially imperforate and semicircular plates, each having an arcuate flange along its circumference, and a plane flange substantially along its diameter, means for securing the plane flanges of the plates to the said table, a bearing having a seat therein shaped to receive the arcuate flanges of the plates and means for clamping the said arcuate flanges to the bearing.

6. A machine table top having a tool-inserting opening leading to a side edge thereof and a set of trunnions for pivotally supporting said top, said trunnions being located in front of and behind said opening, respectively, and consisting of a pair of substantially imperforate and semicircular plates, each having an arcuate flange along its circumference, and a plane flange substantially along its diameter, means for securing the plane flanges of the plates to the said table with the arcuate flanges extending toward one another, a bearing having a seat therein shaped to receive the arcuate flanges of the plates and means for clamping the said arcuate flanges to the bearing, said means comprising a clamping element engaged between the plates and means for drawing said clamping element toward the bearing.

7. A machine table top having a tool-inserting opening leading to a side edge thereof and a set of trunnions for pivotally supporting said top, said trunnions being located in front of and behind said opening, respectively, and consisting of a pair of substantially imperforate and semicircular plates, each having an arcuate flange along its circumference and a plane substantially diametrically located flange, means for securing the plane flanges of the plates to the said table with the arcuate flanges extending toward one another, a bearing having a seat therein shaped to receive the arcuate flanges of the plates and means for clamping the arcuate flanges to the bearing, said means comprising a clamping washer slidably engaged between the plates and a bolt and nut for drawing said clamping washer toward the bearing, said bolt extending through the bearing and through the washer.

8. A machine table top having a tool-inserting opening leading to a side edge thereof and a set of trunnions for pivotally supporting said top, said trunnions being located in front of and behind said opening, respectively, and consisting of a pair of substantially imperforate and semicircular plates, each having an arcuate flange along its circumference, and a plane substantially diametrically located flange, means for securing the plane flanges of the plates to the said table with the arcuate flanges extending toward one another, a bearing having a seat therein shaped to receive the arcuate flanges of the plates and means for clamping the said arcuate flanges to the bearing, said means comprising a clamping washer slidably engaged between the plates and a bolt and nut for drawing said clamping washer toward the bearing, said bolt extending through the bearing and through the washer, and the washer having a recess therein, to receive the head of the bolt and shaped to prevent the bolt from rotating with respect to the washer.

9. A machine table having two trunnions near the front and rear ends thereof respectively, said table having a tool-inserting opening located between said trunnions, the axis of the trunnions being substantially in the cutting plane of the tool, and the opening extending to one side of the table, and a removable plug connecting the two portions of the table formed by the said opening and thus preventing said table from becoming distorted when subjected to stresses in use.

10. A machine table having two trunnions near the front and rear ends thereof respectively, said table having an aperture with a tool-inserting opening leading thereto and located between said trunnions, the axis of the trunnions being substantially in the cutting plane of the tool, and the opening extending to one side of the table, and a removable insert fitting in said aperture and having a tool-receiving slot therein extending substantially in the said cutting plane and at an angle to the direction of the tool-inserting opening of the table.

11. A machine table having two trunnions near the front and rear ends thereof respectively, said table having an aperture with a tool-inserting opening leading thereto and located between said trunnions, the axes of the trunnions being substantially in the cutting plane of the tool, and the opening extending to one side of the table, and a removable insert fitting in said aperture and having a tool-receiving slot therein extending rearwardly from the cutting edge of the tool, substantially in the said cutting plane and at an angle to the direction of the tool-inserting opening of the table.

12. A machine table for use with a band saw blade, and means for pivotally supporting said table to turn about an axis parallel to the direction of cut of the blade, said table having a blade inserting slot running to an edge of the table, said slot extending at an angle to the cutting plane of the blade when the latter is in its operative position.

13. A machine table for use with a band saw blade, said table having at least one trunnion supporting it to turn about an axis parallel to the direction of cut of the blade, said table having a blade-inserting slot running to an edge of the table, said slot extending at an angle to the cutting plane of the blade when the latter is in its operative position.

14. A machine table for use with a band saw blade, said table having at least one trunnion, behind the blade, supporting it to turn about an axis parallel to the direction of cut of the blade, said table having a blade-inserting slot running to an edge of the table, said slot extending at an angle to the cutting plane of the blade when the latter is in its operative position.

15. A machine table for use with a band saw blade, said table having at least one trunnion, in front of the blade, supporting it to turn about an axis parallel to the direction of cut of the blade, said table having a blade-inserting slot running to an edge of the table, said slot extending at an angle to the cutting plane of the blade when the latter is in its operative position.

HERBERT E. TAUTZ.

CERTIFICATE OF CORRECTION.

Patent No. 2,040,718. May 12, 1936.

HERBERT E. TAUTZ.

It is hereby certified that error appears in the printed specification of the above numbered patent requiring correction as follows: Page 3, first column, line 16, for "table extensions" read Table Extensions; and page 4, second column, line 33, claim 11, for "axes" read axis; and that the said Letters Patent should be read with these corrections therein that the same may conform to the record of the case in the Patent Office.

Signed and sealed this 14th day of July, A. D. 1936.

(Seal)

Henry Van Arsdale
Acting Commissioner of Patents.